Aug. 31, 1965  H. D. OGREN  3,203,237
VORTEX RATE SENSOR
Filed Sept. 6, 1962

INVENTOR.
HARVEY D. OGREN
BY Rogers W. Jensen
ATTORNEY

United States Patent Office 3,203,237
Patented Aug. 31, 1965

3,203,237
VORTEX RATE SENSOR
Harvey D. Ogren, Roseville, Minn., assignor to Honeywell Inc., a corporation of Delaware
Filed Sept. 6, 1962, Ser. No. 221,777
2 Claims. (Cl. 73—194)

This invention pertains to vortex rate sensing instruments and more particularly to readout means for vortex rate sensing instruments.

A vortex rate sensor generally comprises a device which provides a fluid flow field which closely approximates the classical two-dimensional pure sink flow in the absence of an input rate. The fluid flow in such a pure sink flow has only radial velocity. When the device is subjected to a rate (angular velocity) input relative to inertial space, a pure vortex flow having only tangential or rotational velocity is superimposed upon the pure sink flow. The superimposition of the pure vortex flow on the pure sink flow results in a combined vortex-sink fluid flow field in which the fluid streamline pattern is a logarithmic spiral, if the viscous effects flowing fluid are neglected. Sensing the effect of the input rate upon the fluid flow field provides a measurement of the input rate.

To satisfy the equation of continuity, the radial velocity of a pure sink flow will increase due to the narrowing of the streamlines as the fluid approaches the sink or outlet passage of the vortex rate sensor. Due to the principle of the conservation of angular momentum, the tangential or rotational velocity of the pure vortex flow will also increase as the flow approaches the sink or outlet passage. It follows that the velocity of the fluid in the combined vortex-sink flow increases as the fluid approaches the sink or outlet passage. Consequently, the vortex rate sensor possesses the unique and desirable characteristic of amplification of the parameter to be sensed (angular velocity) within the sensing device itself. Various amplification levels may be obtained by varying the geometry of the vortex rate sensor.

A rate input superimposes a pure vortex flow upon a pure sink flow so that by sensing the effect of the rate input upon the fluid flow field of the vortex rate sensor, a measurement of the input rate is obtained. However, it is extremely difficult in practice to sense the effect of a rate input upon the fluid flow field without destroying such effect. That is, it is extremely difficult to utilize a readout means which is capable of sensing the effect of a rate input upon the fluid flow field without disturbing the fluid flow and thus losing the desired information.

The applicant provides a unique readout means for sensing the effect of the rate input upon the fluid flow field of a vortex rate sensor by positioning a movable or resiliently mounted obstruction in the fluid flow field which is displaced or moved in response to changes in the fluid flow field as a result of the rate input. Means are provided to sense the displacement of the obstruction and produce an output signal indicative of the displacement of the obstruction and consequently indicative of the rate input. In one specific embodiment of the applicant's invention, the applicant resiliently mounts a streamline element within the outlet passage of a vortex rate sensor. The streamline element is resiliently mounted by means of a strain gauge means. An input rate will result in a rotational component of fluid flow within the outlet passage which will displace the streamline element. The strain gauge means senses the displacement and produces an electrical output signal indicative of the input rate.

It is therefore an object of this invention to provide an improved vortex rate sensor.

These and other objects of the invention will become apparent from a study of the accompanying specification and claims in conjunction with the drawings in which:

Figure 1:
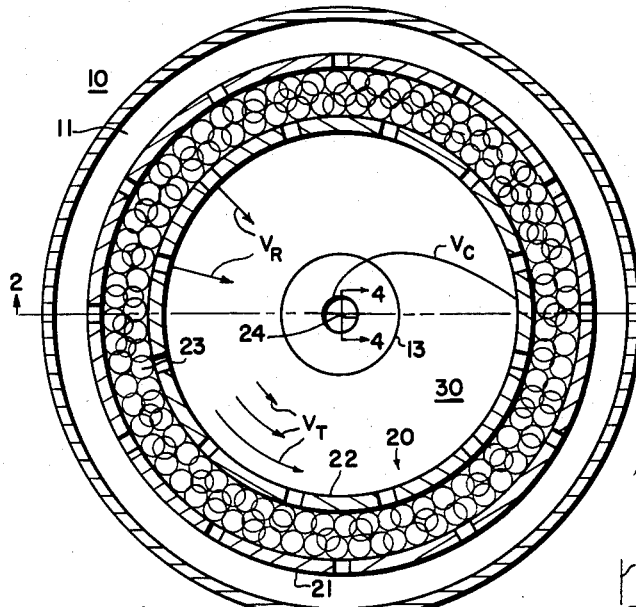
FIGURE 1 is a cross sectional view of a vortex rate sensor taken along lines 1—1 of FIGURE 2.
Figure 2:
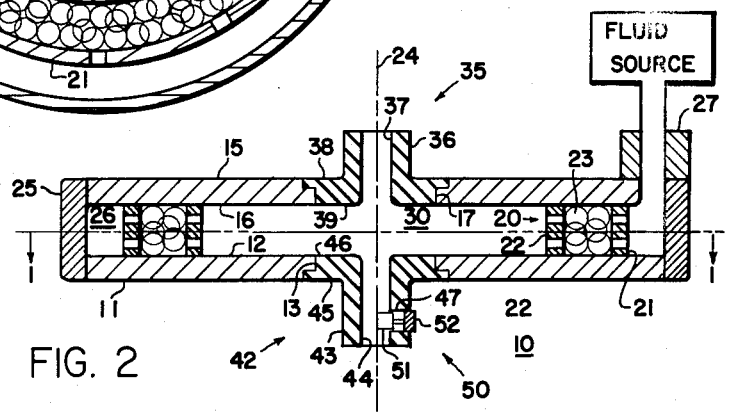
FIGURE 2 is a cross sectional view taken along lines along lines 2—2 of FIGURE 1.

Referring now to FIGURES 1 and 2, reference numeral 10 generally depicts a vortex rate sensor. A cylindrical element 11 is provided having a plane surface 12 thereon. Element 11 has a central aperture 13 therethrough having a circular cross section. A second cylindrical element 15 is provided having a plane surface 16 thereon. Element 15 has a central aperture 17 therethrough having a circular cross section.

Reference numeral 20 depicts annular porous coupling means. Coupling means 20 comprises a cylindrical outer screen member 21 and a cylindrical inner screen member 22. Inner screen member 22 has a slightly smaller diameter than outer screen member 21. Positioned intermediate inner screen member 22 and outer screen member 21 are a plurality of glass balls 23 having a small diameter, approximately .015 inch in the embodiment illustrated. It is clear that coupling means 20 is porous in nature and allows fluid to pass therethrough with a minimum of restriction. The applicant does not wish to be limited to the coupling means illustrated since other porous coupling means may be utilized, for example, sintered metals or ceramics.

Coupling means 20 is positioned between elements 11 and 15 so as to maintain plane surfaces 12 and 16 in a spaced parallel relationship. The axis of cylindrical coupling means 20 is identified by reference numeral 24. Axis 24 is substantially perpendicular to plane surfaces 12 and 16.

Elements 11 and 15 in conjunction with coupling means 20 collectively define a cylindrical vortex chamber 30. The outer periphery of chamber 30 is defined by inner screen member 22. The ends of chamber 30 are defined by plane surface 12 of element 11 and plane surface 16 of element 15.

A generally cylindrically shaped element 25 is positioned around the outer periphery of elements 11 and 15 enclosing the space therebetween. Element 25 is rigidly attached to elements 11 and 15 by suitable means (not shown) such as screws or adhesives. Element 25 is spaced apart from outer screen member 21 and in conjunction therewith defines a manifold 26 between elements 11 and 15. Fluid is supplied to manifold 26 through an ingress 27 which is connected to a fluid source.

A first exit member 35 is provided. Exit member 35 comprises a tube or fluid conduit 36 having a generally cylindrical bore or passage 37 therethrough. Although a cylindrical passage is illustrated, passages having other configurations are within the scope of applicant's invention. Conduit or tube 36 has a external flange portion 38 on one end thereof. Flange portion 38 is positioned within aperture 17 of element 15 so that passage 37 of exit member 35 is positioned substantially coaxial with axis 24. An end surface 39 of exit member 35 is positioned so as to lie in the same plane as plane surface 16 of plate element 15. Exit member 35 is rigidly attached to element 15 by suitable means (not shown) such as adhesives or screws.

A second exit member 42 is also provided. Exit member 42 comprises a tube or fluid conduit 43 having a cylindrical bore or passage 44 therethrough. Although a cylindrical passage is shown, passages having other configurations are within the scope of the applicant's invention. Conduit or tube 43 has an external flange portion 45 on one end thereof. Flange portion 45 is positioned within aperture 13 of element 11 so that passage 44 is positioned substantially coaxial with axis 24. An end surface 46 of exit member 42 is positioned so as to lie in the same plane as plane surface 12 of element 11. Exit member 42 is rigidly attached to element 11 by suitable means (not shown) such as adhesives or screws. Although two outlet passages are illustrated, it should be pointed out that only one outlet passage, such as passage 44, is necessary for operation of the vortex rate sensor.

Figure 4:
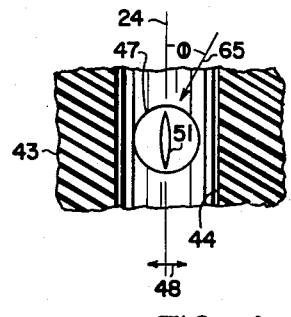
FIGURE 4 is an enlarged cross sectional view taken along lines 4—4 of FIGURE 1.
Figure 3:
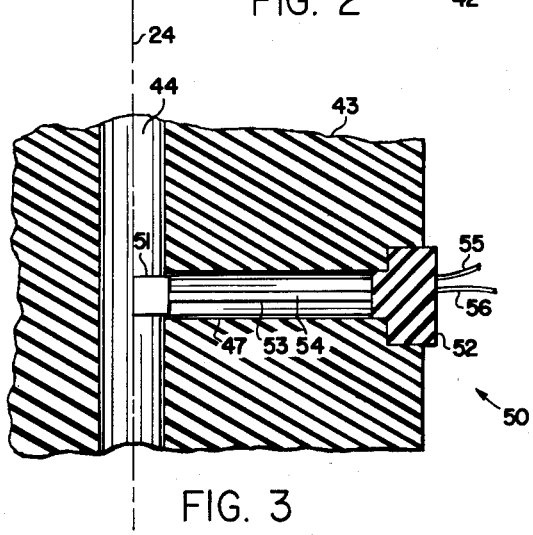
FIGURE 3 is an enlarged cross sectional view of the readout means.

A readout means 50 is provided and is illustrated in FIGURE 2 as positioned within a bore 47 in exit member 42. Readout means 50 is more clearly illustrated in FIGURE 3. An obstruction means 51 is positioned within passage 44 of exit member 42. Obstruction means 51 in one embodiment of the applicant's invention takes the form of a streamline or airfoil element. The applicant does not wish to be limited to the particular geometry illustrated for obstruction means 51; other configurations of the obstruction may be utilized. In the embodiment illustrated in FIGURES 1 through 4 obstruction means 51 is shown as a thin symmetrical airfoil. As best illustrated in FIGURE 4, obstruction means 51 is positioned within passage 44 substantially parallel to axis 24. That is, the surfaces of obstruction means 51 are generally parallel with the axis of passage 44. Obstruction means 51 is resiliently or movably mounted upon a base means 52 by means of a cantilever support 53. Obstruction means 51 is attached to support 53 by means of a suitable adhesive and support 53 is attached to base means 52 by means of a suitable adhesive. Support 53 in one embodiment of the applicant's invention is fabricated from a semiconductor material, such as silicon, which has a conductive coating along one surface 54 thereof so as to provide a strain gauge element. Obstruction means 51 is free to be displaced, relative to base means 52 and exit member 42, either into or out of the plane of the drawing (FIGURE 3). Stated otherwise, obstruction means 51 is free to be displaced relative to exit member 42 in a manner indicated by arrow 48 in FIGURE 4.

In the embodiment illustrated, obstruction means 51 is positioned so as to extend into passage 44 a distance of approximately one half the diameter of passage 44. A portion of obstruction means 51 also extends a short distance into bore 47 so as to minimize fluid flow into bore 47. Characteristic dimensions of one embodiment are as follows. The diameter of passage 44 is approximately .090 inch. Obstruction element 51 has a length of .050 inch, a height of .055 inch and a maximum thickness of .006 inch as viewed in FIGURE 3. Support 53 has a length of .350 inch, a height of .020 inch and a thickness of .004 inch. These dimensions are merely illustrative and the applicant does not wish to be limited thereto; other dimensions may be utilized without departing from the scope of this invention.

Two leads are provided for readout means 50. A lead 55 is connected to surface 54 adjacent to the obstruction end of support 53. A lead 56 is attached to surface 54 adjacent to the base end of support 53. For reasons of clarity, leads 55 and 56 are not shown as attached to the support 53 in FIGURE 3.

Figure 5:
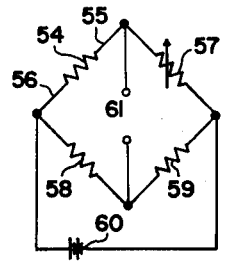
FIGURE 5 is a schematic electrical diagram of the readout means.

Leads 55 and 56 connect surface 54 to a typical bridge circuit such as illustrated in FIGURE 5. Surface 54 thus becomes the unknown resistance in a bridge circuit. A variable resistance 57 is provided along with known resistors 58, 59. The bridge circuit is energized by a voltage source 60 and an output signal is obtained across output terminals 61. The applicant does not wish to be limited to the schematic representation of the bridge circuit illustrated in FIGURE 5. Other circuits may be utilized to sense the change in resistance in surface 54.

Although only a single strain gauge has been illustrated, various other embodiments will be apparent to one skilled in the art. For example, two strain gauge elements may be utilized in a differential relationship and connected in opposite legs of a bridge circuit. Other motion sensing means, such as optical means, may be utilized and are within the scope of the applicant's invention.

In operation, a pressure differential exists between manifold 26 and passages 37 and 44 of exit members 35 and 42. Consequently, a fluid flows from manifold 26 through coupling means 20, chamber 30, and out through passages 37 and 44. In the absence of any rate input (angular velocity about axis 24) the fluid flow field comprises only radial velocity as illustrated by vectors $V_R$ in FIGURE 1. A flow field having only radial velocity is described by those skilled in the art as a pure sink flow. When the vortex rate sensor is subjected to an input rate $\omega$, the fluid located within coupling means 20 is given a tangential or rotational velocity as illustrated by vectors $V_T$ in FIGURE 1. The tangential or rotational velocity imparted to the fluid is referred to by those skilled in the art as a pure vortex flow. The superimposition of the pure vortex flow upon the pure sink flow results in the combined vortex-sink flow. The streamline pattern of the fluid, neglecting viscous effects, in the combined vortex-sink flow is a logarithmic spiral as identified in FIGURE 1 by the reference symbol $V_C$. The fluid in chamber 30 flows parallel to plane surfaces 12 and 16. The fluid flowing in the logarithmic spiral flow pattern exhausts from chamber 30 through passages 37 and 44. Passages 37 and 44 are substantially coaxial with axis 24 and thus perpendicular to the plane of the fluid flow in chamber 30. Thus as the fluid flows out of the vortex chamber 30 through passages 37 and 44 it is displaced 90° from its original plane of flow. This results in a fluid flow pattern in passages 37 and 44 in the form of a helix. That is to say, there is a component of fluid flow having a longitudinal velocity parallel to axis 24 and a component of fluid flow having a rotational velocity perpendicular to axis 24.

The tangential or rotational velocity $V_T$ imparted to the fluid within coupling means 20 by the rate input appears in bore or passage 44 as the component of fluid flow having a velocity perpendicular to the axis 24. The magnitude of the tangential or rotational velocity is amplified within the vortex rate sensor and is indicative of the rate input. Consequently it is possible to sense the input rate $\omega$ by determining the sense and magnitude of the fluid flow perpendicular to axis 24.

With no input rate, the fluid flow in chamber 30 is a pure sink flow and the fluid flow in passage 44 is longitudinal only, that is, parallel to the axis 24. When the fluid flow is parallel to the axis 24, the pressure on either side of obstruction means 51 is equal (when obstruction means 51 is in the form of a symmetrical airfoil). Therefore, there is no net force acting upon obstruction means 51 perpendicular to its surfaces as viewed in FIGURE 4, and obstruction means 51 will not be displaced relative to exit member 42. Thus no change of resistance is noted in surface 54 and no output signal is produced at output terminals 61.

However, when the vortex rate sensor is subjected to a rate input $\omega$, the fluid flows through passage 44 in a helix pattern and impinges upon obstruction means 51 at an and $\phi$ relative to axis 24 as illustrated by arrow 65 in FIGURE 4. It can be shown that helix angle $\phi$ at which the fluid impinges upon obstruction means 51 is a function of the input rate $\omega$. The magnitude of the pressure differential across obstruction means 51 is a function of helix angle $\phi$. Consequently the pressure differential across obstruction means 51 is indicative of the input rate $\omega$ when the fluid flow is held constant. Existence of a pressure differential across obstruction means 51 will result in a net force being applied thereto perpendicular to its surfaces as viewed in FIGURE 4. This net force will cause movement or displacement of obstruction means 51 relative to base means 52 and exit member 42 as indicated by arrow 48. If the net force is directed so as to force obstruction means 51 to the left as viewed in FIGURE 4, surface 54 will be in tension with a resulting increase in resistance. This change in resistance will be sensed at pickoff terminals 61 so as to produce an output signal indicative of the rate input ω. Should the net force displace obstruction means 51 to the right as viewed in FIGURE 4, surface 54 will be in compression with a resulting decrease in resistance. Thus it is clear that the applicant's readout means provides a means for determining the sense of the rate input ω. In addition, the magnitude of the rate input ω is determined by the magnitude of the change of resistance.

While I have shown and described a specific embodiment of my invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:
1. In a vortex rate sensor:
a first element having a first passage therethrough;
a second element having a second passage therethrough;
annular porous coupling means positioned between said first and said second elements so as to maintain said first and second elements in a substantially parallel spaced relationship, the axis of said first passage and the axis of said second passage being substantially coaxial with the axis of said coupling means; and
readout means including airfoil means and strain gauge means, said airfoil means being resiliently mounted in cantilever fashion within said first passage substantially parallel to said axis of said coupling means by said strain gauge means, said strain gauge means producing a signal indicative of the displacement of said airfoil means in response to fluid flow perpendicular to the axis of said first passage.

2. In a vortex rate sensor:
a first member having a passage therethrough;
a second member;
porous coupling means; said first member and said second member being mounted on said coupling means to form a cylindrical chamber, the axis of said passage being parallel to the axis of said chamber, said passage being in communication with said chamber so that a flow of fluid through said coupling means and said chamber exits through said passage; and
readout means including airfoil means and strain gauge means, said airfoil means being mounted in cantilever fashion within said passage by said strain gauge means for producing a signal indicative of the displacement of said airfoil means in response to fluid flow perpendicular to said axis of said passage.

References Cited by the Examiner

UNITED STATES PATENTS

| | | |
|---|---|---|
| 1,841,606 | 1/32 | Kollsman. |
| 2,215,447 | 9/40 | Kollsman. |
| 3,023,627 | 3/62 | Geyling. |
| 3,038,334 | 6/62 | Li _____ 73—194 |

FOREIGN PATENTS

| | | |
|---|---|---|
| 116,375 | 6/18 | Great Britain. |

RICHARD C. QUEISSER, *Primary Examiner.*

SAMUEL FEINBERG, *Examiner.*